United States Patent [19]
Jung

[11] Patent Number: 6,122,687
[45] Date of Patent: *Sep. 19, 2000

[54] MULTIMEDIA COMPUTER SYSTEM HAVING MULTIMEDIA BUS

[75] Inventor: Yong-Hyun Jung, Kyunggi Province, Rep. of Korea

[73] Assignee: SamSung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/901,321

[22] Filed: Aug. 5, 1997

[30] Foreign Application Priority Data

Aug. 5, 1996 [KR] Rep. of Korea ............... 96-32626

[51] Int. Cl.[7] ............................................. G06F 13/36
[52] U.S. Cl. ...................... 710/100; 710/8; 710/101; 710/104; 379/88.13; 439/954
[58] Field of Search ............................ 395/308, 306, 395/309, 281, 822, 856, 311, 280, 892, 307; 348/465; 702/122; 370/395; 361/727; 710/101, 104, 8, 106, 124, 127, 100, 27; 439/954, 683; 379/88.13; 709/250, 108; 712/32, 104; 345/502

[56] References Cited

U.S. PATENT DOCUMENTS

| | | | |
|---|---|---|---|
| 4,471,458 | 9/1984 | Weilbacker et al. | 710/131 |
| 5,201,038 | 4/1993 | Fielder | 710/100 |
| 5,283,819 | 2/1994 | Glick et al. | 379/93.01 |
| 5,457,780 | 10/1995 | Shaw et al. | 345/502 |
| 5,462,442 | 10/1995 | Umemura et al. | 439/69 |
| 5,488,695 | 1/1996 | Cutter | 395/290 |
| 5,488,705 | 1/1996 | LaBarbera | 395/309 |
| 5,548,730 | 8/1996 | Young et al. | 395/280 |
| 5,602,721 | 2/1997 | Slade et al. | 361/727 |
| 5,608,876 | 3/1997 | Cohen et al. | 395/281 |
| 5,630,163 | 5/1997 | Fung et al. | 395/307 |
| 5,630,167 | 5/1997 | Hosokawa | 395/823 |
| 5,630,175 | 5/1997 | Gajewski et al. | 395/892 |
| 5,638,521 | 6/1997 | Buchala et al. | 395/311 |
| 5,699,359 | 12/1997 | Suga | 370/395 |
| 5,793,998 | 8/1998 | Copeland et al. | 395/309 |
| 5,797,028 | 8/1998 | Gulick et al. | 712/32 |
| 5,812,800 | 9/1998 | Gulick et al. | 395/308 |
| 5,822,551 | 10/1998 | Crane, Jr. et al. | 710/127 |
| 5,839,095 | 11/1998 | Liu | 702/122 |
| 5,872,942 | 2/1999 | Swanstrom et al. | 710/129 |
| 5,951,664 | 9/1999 | Lambrecht et al. | 710/124 |
| 6,052,744 | 4/2000 | Moriarty et al. | 710/27 |
| 6,061,711 | 5/2000 | Song et al. | 710/108 |

OTHER PUBLICATIONS

Ray Alderman, "Here Come The PCI Buses", *Electric Design*, Jul. 21, 1997, pp. 76 and 78.

*Primary Examiner*—John A. Follansbee
*Assistant Examiner*—Walter Benson
*Attorney, Agent, or Firm*—Robert E. Bushnell, Esq.

[57] ABSTRACT

A multimedia player system has a computer-based control center and stations of analog audio/video sources connected by and expandable through a multimedia bus. The bus structure is applicable to a multimedia computer environment and by using the multimedia bus and its connector, the multimedia computer system joins with the external audio/video sources having components, the number of which are expandable to be as much as needed. The analog audio/video signals that cannot be transferred by the digital PCI bus are transferred through the multimedia bus, across the multimedia component system. One of the desired external audio/video sources can then be selected by a control signal of the computer based control center.

19 Claims, 7 Drawing Sheets

MULTIMEDIA COMPUTER SYSTEM HAVING MULTIMEDIA BUS

CLAIM OF PRIORITY

This application makes reference to, incorporates the same herein, and claims all benefits accruing under 35 U.S.C. §119 from an application entitled MULTIMEDIA COMPUTER SYSTEM HAVING MULTIMEDIA BUS earlier filed in the Korean Industrial Property Office on Aug. 5, 1996, and there duly assigned Serial No. 96-32626 by that Office.

FIELD OF THE INVENTION

The present invention relates to a multimedia computer system. More particularly, the present invention relates to a multimedia player system having a computer-based control center and stations of analog audio/video sources.

BACKGROUND OF THE INVENTION

As the microprocessors progress in performance and scale, personal computer systems (which use the microprocessors) move drastically to the multimedia environment for processing various information—such as text, sounds, graphics, animation, movie, and so forth. Such computer systems are now called multimedia computers. In order to achieve multimedia function, hardware devices such as a high performance video card, sound card, TV/radio card, modem, etc. are installed in the expansion slots of the computer main board. Also, peripheral devices such as CD-ROM drives and various kind of software drivers can be implemented. Further, the multimedia data fed from the above expansion boards or peripheral devices are transferred to the central processing unit (CPU) via local bus under control of the computer operating system. In order to enhance data transfer rate between the CPU and the peripheral devices, the Peripheral Component Interconnect (PCI) standard has been established. The basic features of the PCI bus are: it usually has 64 bits data structure and provides two operating voltages systems. Also, auto detection and auto setup (Plug and Play function) of the connected devices is available.

Figure 1:
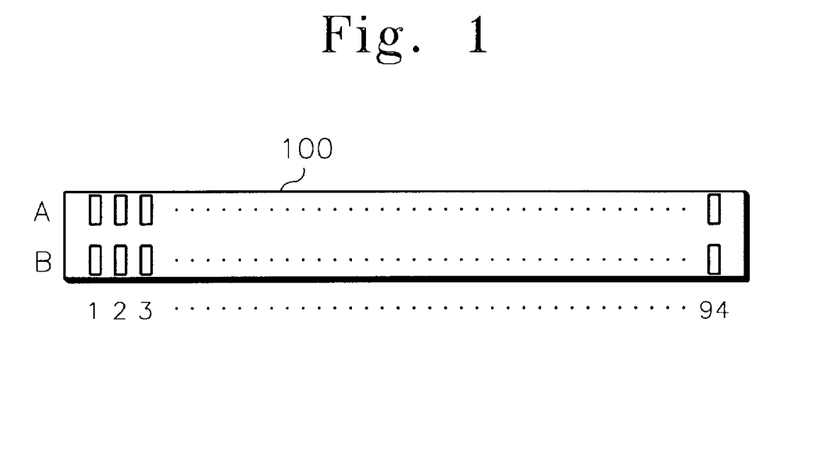
FIG. 1 illustrates a pin configuration of a PCI slot used in personal computer systems.

FIG. 1 shows the pin configurations of the conventional PCI bus connector or PCI slot. The connector 100 has a plurality of connector pins arranged in two rows. Each row, designated by A and B, has 94 pins. Pin numbers 1 to 62 of each row are used for the 32-bit data structure, and 63 to 94 are for the 64-bit data structure. Pins located at the first column of the rows is denoted by A1 and B1, and at the last column is denoted by A94 and B94. Each of the pins are connected by predetermined signal lines according to the PCI standard, and the arrangement thereof (for example, when used with 5 volts operating voltage) is shown in table I.

TABLE I

| No | B | A |
|----|------|------|
| 1 | −12V | TRST# |
| 2 | TCK | +12V |
| 3 | GND | TMS |
| 4 | TDO | TDI |
| 5 | +5V | +5V |
| 6 | +5V | INTA# |
| 7 | INTB# | INTC# |
| 8 | INTD# | +5V |

TABLE I-continued

| No | B | A |
|----|------|------|
| 9 | PRSNT1 | RESERVED |
| 10 | RESERVED | 5V |
| 11 | PRSNT2 | RESERVED |
| 12 | GND | GND |
| 13 | GND | GND |
| 14 | RESERVED | RESERVED |
| 15 | GND | RST# |
| 16 | CLK | +5V |
| 17 | GND | GNT# |
| 18 | REQ# | GND |
| 19 | 5V | RESERVED |
| 20 | AD31 | AD30 |
| 21 | AD29 | +3.3V |
| 22 | GND | AD28 |
| 23 | AD27 | AD26 |
| 24 | AD25 | GND |
| 25 | +3.3V | AD24 |
| 26 | C/BE3# | IDSEL |
| 27 | AD23 | +3.3V |
| 28 | GND | AD22 |
| 29 | AD21 | AD20 |
| 30 | AD19 | GND |
| 31 | +3.3V | AD18 |
| 32 | AD17 | AD16 |
| 33 | C/BE2# | +3.3V |
| 34 | GND | FRAME# |
| 35 | IRDY | GND |
| 36 | +3.3V | TRDY# |
| 37 | DEVSEL | GND |
| 38 | GND | STOP# |
| 39 | LOCK# | +3.3V |
| 40 | PERR# | SDONE |
| 41 | +3.3V | SBO# |
| 42 | SERR# | GND |
| 43 | +3.3V | PAR |
| 44 | C/BE1# | AD15 |
| 45 | AD14 | +3.3V |
| 46 | GND | AD13 |
| 47 | AD12 | AD11 |
| 48 | AD10 | GND |
| 49 | GND | AD09 |
| 50 | BORDER | |
| 51 | | |
| 52 | AD08 | C/BE0# |
| 53 | AD07 | +3.3V |
| 54 | +3.3V | AD06 |
| 55 | AD05 | AD04 |
| 56 | AD03 | GND |
| 57 | GND | AD02 |
| 58 | AD01 | AD00 |
| 59 | +5V | +5V |
| 60 | ACK64# | REQ64# |
| 61 | +5V | +5V |
| 62 | | |
| 63 | RESERVED | GND |
| 64 | GND | C/BE7# |
| 65 | C/BE6# | C/BE5# |
| 66 | C/BE4# | +5V |
| 67 | GND | PAR64 |
| 68 | AD63 | AD62 |
| 69 | AD61 | GND |
| 70 | +5V | AD60 |
| 71 | AD59 | AD58 |
| 72 | AD57 | GND |
| 73 | GND | AD56 |
| 74 | AD55 | AD54 |
| 75 | AD53 | +5V |
| 76 | GND | AD52 |
| 77 | AD51 | AD50 |
| 78 | AD49 | GND |
| 79 | +5V | AD48 |
| 80 | AD47 | AD46 |
| 81 | AD45 | RESERVED |
| 82 | GND | AD44 |
| 83 | AD43 | AD42 |
| 84 | AD41 | +5V |
| 85 | GND | AD40 |

TABLE I-continued

| No | B | A |
|---|---|---|
| 86 | AD39 | AD38 |
| 87 | AD37 | GND |
| 88 | +5V | 3.3V |
| 89 | AD35 | AD35 |
| 90 | AD33 | AD33 |
| 91 | GND | GND |
| 92 | RESERVED | RESERVED |
| 93 | RESERVED | GND |
| 94 | GND | RESERVED |

In table I, the signals on the 32-bits data PCI bus are as follows:

CLK (clock). A signal line that supplies clock signals for operating PCI devices.

RST#. A signal line for resetting a control device connected with the PCI bus.

AD31~AD00. Address and data signal lines using multiplexed signaling schemes. Selection is made by using the signal lines FRAME#. Logical high of the FRAME# signal is indicative of usage for the data, and logical low for the address.

C/BE0#~C/BE3#. Command or effective byte signal lines, operated in multiplex mode. Commands for the operation of the address, and effective byte for the data.

PAR (Parity). Even parity for AD31~AD00 and C/BE0#~C/BE3# signal lines.

FRAME#. Signal occurs during access to other device through PCI bus. For the time duration in the data processing, the signal is logical low.

IRDY (Initiator Ready). A signal indicative of status of initiator device related to data transaction.

TRDY# (Target Ready). A signal indicative of status of target device.

STOP#. A request to stop transmittal of a signal from target device to initiator device.

LOCK#. A signal occurring when multiple transactions are required for completion of the action in progress.

IDSEL. (Initialization Device Select). A signal used for reading the configuration register provided in each of the peripheral devices, and used as a chip select signal when writing data in the configuration register.

DEVSEL# (Device Select). As a result of decoding address lines, when a device is selected as a target device, the signal becomes active low. Otherwise, the active low signal is used to select a device on the PCI bus.

REQ# (Request). A signal line requesting a grant of usage of the PCI bus to the arbitrator when a master device is about to use the PCI bus.

GNT# (Grant). A signal indicating grant for the request for usage of the PCI bus.

PERR# (Parity Error). A signal indicating that a problem is found in the data parity.

SERR# (System Error). A signal indicating that a parity error, data parity, or other critical problems are found.

INTA#, INTB#, INTC#, INTD#. Interrupt signal lines.

SBO#, SDONE# (Snoop Backoff, Snoop Done). Signal lines for supporting cache function of the device having cacheable memory.

TCK, TDI, TDO, TMS, TRST#. Signal lines provided for testing PCI devices.

PRSNT1#, PRSNT2# (Present). Signal lines for reporting the installation of a PCI device in a slot, and information for the power dissipation thereof.

Further, signal lines provided for the 64-bits data PCI bus are described as follows:

AD63~AD32. Address/data signal lines with respect to the most 32 bits in total 64 bits.

C/BE4~C/BE7. Signal lines indicative of command or effective byte for the most 32 bits data.

REQ64#. Signal follows logical low when the 64-bit data structure is required.

ACK64#. Responsive to the REQ64# signal, a signal indicative of the recognition of the target device.

PAR64. Signals for reporting the status of parity regarding the most 32 bits in the 64-bit data. Even parity is applied.

As is apparent from FIG. 1 and Table I, the conventional PCI bus is configured to transfer digital data or addresses through the address/data signal lines AD00~AD63. In addition, control signal lines are provided to control peripheral devices on the bus. Nevertheless, there are currently various audio/video apparatuses, for example digital satellite receivers, video disk players, CATV receiver sets, etc., other than the functional expansion board installed in the computer system. Therefore, a need arises for transferring the graphics and sound generated at an external audio/video source and handling them in the multimedia computer. To meet this need, an external cable is required to transfer audio or video signals from the output terminals of the audio/video source to the input terminals of the computer. When the number of the required external audio/video sources increases, increasing the number of connection cables and terminals is necessary. Therefore, the cable connection becomes complicated, and signal attenuation as well as noise occurs when analog formatted audio/video signals are transferred through the cable. Also, controlling the external audio/video apparatus by the computer using the external cable is difficult. Further, in conventional multimedia computers having Industry Standard Architecture and PCI bus connectors, there is a limitation of the number of available peripheral devices connected therewith. Thus, an improvement and further insight on the current art of peripheral connectors and multimedia is necessary.

On this matter, an exemplar of the contemporary practice and art, Buchala et al. (U.S. Pat. No. 5,638,521, Apparatus Using A Parallel Interface For Data Transfer Between A Plurality Of Computers, As Well As For Transfer Of Data From Computers To Shared Peripheral Devices, Jun. 10, 1997) discusses an apparatus having a plurality of computers for selective data transfer from the computers to, at least, one shared output device. Gajewski et al. (U.S. Pat. No. 5,630, 175, Surround Sound System boor General Purpose Computer Using Dual Sound Cards, May 13, 1997) discusses surround sound channels being played or recorded using an audio card added to the computer system, which audio card controls additional speakers and/or microphones. Hosokawa (U.S. Pat. No. 5,630,167, Electronic Apparatus Having A Plurality Of Connectors Each Connecting to One Of A Plurality Of Kinds Of Cards, May 13, 1997) discusses a plurality of connectors and a plurality of kinds of integrated circuit cards adapted to be connected to the plurality of connectors. Fung et al. (U.S. Pat. No. 5,630,163, Computer Having A Single Bus Supporting Multiple Bus Architectures Operating With Different Bus Parameters, May 13, 1997) discusses a data processing system including a central processing unit and control circuitry on a single chip connected by a common bus to two or more bus devices having different sets of bus parameters. A second set of bus parameters functions as an I/O bus for I/O device transfers. Cohen et al. (U.S. Pat. No. 5,608,876, Add-In Board With Enable-Disable Expansion ROM For PCI Bus Computers, Mar. 4, 1997) discusses an adapter or add-in card for use in a peripheral component interconnect (PCI) computer, including a universal module which couples the card to the PCI bus. Young et al. (U.S. Pat. No. 5,548,730, Intelligent Bus Bridge For Input/Output Subsystems In A Computer System, Aug. 20, 1996) discusses an intelligent bus bridge including a local processor coupled for communication over a local component bus and a local memory controller that enables access to a local memory from the local component bus. LaBarbera (U.S. Pat. No. 5,488,705, Apparatus For Connecting Computer Devices, Jan. 30, 1996) discusses an integrated circuit capable of multiplexing and then serializing parallel bus and tag information received from one or more interfaces of one of the computer devices. Cutter (U.S. Pat. No. 5,488,695, Video Apparatus Board In Expansion Slot Independently Exercising As Bits Master Control Over System Bus In Order To Relief Control Of Host Computer, Jan. 30, 1996) discusses a video peripheral board having a video I/O port configured to connect a video device, a bus interface circuit, and a processor. From my study of the contemporary practice and art, I find that there is a need for an improved and effective connector system for components of a computer-based multimedia system.

SUMMARY OF THE INVENTION

Therefore, an object of the present invention is to provide an improved multimedia computer system.

Another object of the present invention is to provide a multimedia player system having a computer-based control center and stations of analog audio/video sources.

Another object of the present invention is to solve the problems of the prior art multimedia computer system.

Another object of the present invention is to provide a multimedia computer system capable of connecting a plurality of external audio/video apparatuses and controlling the same in an easy and effective manner.

Another object of the present invention is to provide a novel bus system for use in the multimedia computer system, which can transfer analog audio/video signals fed from the external audio/video sources and digital control signals without using external cables.

To achieve these and other objects, a multimedia computer system of the present invention has a computer-based control center and a multitude of stations of analog audio/video sources. The system has a first connector mounted at upper and lower sides of the control center and each of the stations and a second connector mounted adjacent to the first connector at upper and lower portion of the control center and each stations, wherein each of the first connector and the second connector are aligned across the multimedia player system. The system also has a first bus of a multitude of signal lines for connecting the corresponding pins of the first connector with an analog signal input/output means of the control center and each of the stations and a second bus of a multitude of signal lines for connecting the corresponding pins of the second connector with the system bus of the control center and a digital signal input/output mechanism of each of the stations.

The pins of the first connector and the second connector may be arranged in three rows, and the connector may be formed into a pair of male connectors and a pair female connectors, which can be coupled and are detachable. Further, there are 18 pins arranged and located in each row of the first connector.

The present invention may also have the pins of the first connector arranged in two rows, and the connector formed into a female connector, which is mounted on the main board of the computer to receive the corresponding terminals of a functional expansion board producing an audio/video signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 2:
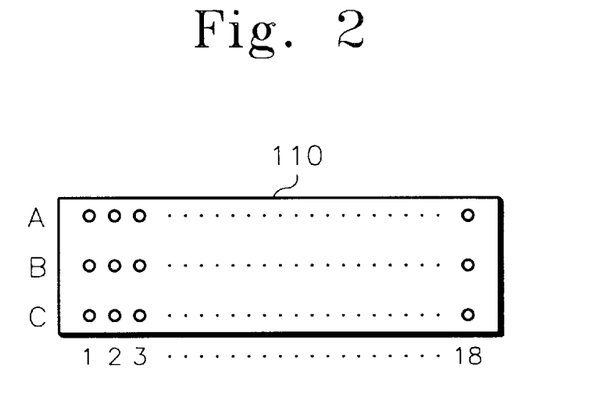
FIG. 2 illustrates a pin configuration of a connector for use in a multimedia player system in accordance with the principles of the present invention.

Turning now to the drawings, FIG. 2 shows one of the pin configurations of a connector for use in a multimedia player system according to this invention. This connector is devised to connect analog signal lines and digital control signal lines provided between the external audio/video sources and the computer system. The connector 110 has a plurality of connector pins arranged in three rows. Each row designated by A, B, C has 18 pins. Pins thus located at the first column of the rows can be denoted by A1, B1, C1. The connector 110 may be constructed in any form of a male connector or a female connector and can be coupled as a pair and also be detached.

Figure 3:
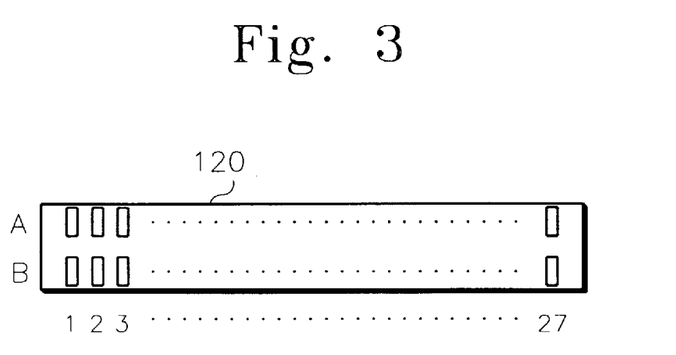
FIG. 3 illustrates another pin configuration of a connector for use in a multimedia player system in accordance with the principles of the present invention.

FIG. 3 shows another pin configuration of the connector for use in the computer system of the multimedia player according to this invention. A comparison with the conventional connector of the ISA slot or PCI slot would be useful. The connector 120 of the present invention has a plurality of connector pins regularly spaced and arranged in two rows along inner side walls of the connector 120. Each of the rows A and B has 27 pins for receiving terminals of a specific electronic circuit board or card designed to produce analog video and/or audio signals. As the above connectors 110 and 120 are made for connecting analog signal lines and for transferring control signals between the computer system and a plurality of external audio/video sources, the connectors 110 and 120 can be called "multimedia connectors." Further, compared to the conventional ISA or PCI bus, the analog signal lines and control signal lines coupled to the connectors 110 or 120 may be called "multimedia bus"; the terms "multimedia connector" and "multimedia bus" will be used throughout the specification hereinafter.

The structure of the multimedia bus related to the multimedia connector 110, (which is one example among the permissible examples) is defined and shown in table II.

TABLE II

| Pin No. | A | B | C |
|---|---|---|---|
| 1 | Vcc | VS2 | AUDIO_OUT_RIGHT |
| 2 | Ext_Key | NTSC/PAL | KB_CLK |
| 3 | +12 Volt | EXTSMI 1 | VKB_CLK |
| 4 | VSYNC | EXT_RED | KB_DATA |
| 5 | HSYNC | EXT_GREEN | VKB_DATA |
| 6 | CSYNC | DOCKIN | BW |
| 7 | VGND | GXT_BLUE | MS_CLK |
| 8 | VGA_RED | VGND | VMS_CLK |
| 9 | GND | EBU_OUT | BL |
| 10 | VGA_GREEN | VGA_DCLK | MS_DATA |
| 11 | VGA_BLUE | PC_SPEAKER | VMS_DATA |
| 12 | GND | AUDIO_IN_LEFT | GND |
| 13 | VIDEO_IN | SCART_IN_LEFT | AS0 |
| 14 | VGND | AUDIO_IN_RIGHT | AS1 |
| 15 | BVL | SCART_IN_RIGHT | AS2 |
| 16 | VS0 | AUDIO GND | DS0 |
| 17 | VS1 | AUDIO_OUT_LEFT | DS1 |
| 18 | EXTSMI0 | DOBM | DS2 |

In table II, the signals on the multimedia bus are described as follows:

Vcc. Operating voltage supply line. For example +5 volts.

12V. Power supplying line for external audio/video apparatus.

VSYNC, HSYNC, CSYNC. Signal lines for vertical synchronizing signal, horizontal synchronizing signal, and composite synchronizing signal of a video signal, respectively.

VGA_RED, VGA_GREEN, VGA_BLUE. Signal lines for supplying divided color picture signals to the VGA card of computer system.

VIDEO_IN. Signal line for the composite video signal.

VS0, VS1, VS2. Control signal lines for selecting video signal from a video source.

NTSC/PAL. Signals indicating whether a television signal transferred through the VIDEO_IN line is NTSC mode or PAL mode.

AUDIO_IN_LEFT, AUDIO_IN_RIGHT. Signal lines transferring left and right channel stereo audio source signals.

AUDIO_OUT_LEFT, AUDIO_OUT_RIGHT. Signal lines transferring left and right channel stereo audio output signals.

SCART_IN_LEFT, SCART_IN_RIGHT. Signal lines transferring stereo audio source signals of external audio/video sources.

DOBM. On/off control signal line for digital audio sources.

KB_CLK, KB_DATA. Signal lines for transferring keyboard clock signal and key input data, respectively.

VKB_CLK, VKB_DATA. Signal lines for transferring virtual keyboard clock signal and key input data, respectively.

MS_CLK, MS_DATA. Signal lines for transferring mouse clock signal and mouse output data, respectively.

VMS_CLK, VMS_DATA. Signal lines for transferring virtual mouse clock signal and mouse output data, respectively.

AS0, AS1, AS2. Control signal lines for analog audio sources (Reserved).

DS0, DS1, DS2. Control signal lines for digital audio sources (Reserved).

BVL, BW, BL. Signal lines for transferring a power level of a battery.

GND (Ground). Grounding line for a specific source signal.

EXT_KEY. Signal line for disabling video signals according to external device condition.

EXT_SMI0, EXT_SMI1. External wake up signal lines heading for the computer system it , operated in a power management mode.

EXT_RED, EXT_GREEN, EXT_BLUE. External color picture signals MPEG formatted.

DOCKIN. Signal indicative of docking station in.

VGA DCLK. VGA Dot clock signal.

PC_SPEAKER. Output signal line from pc-speaker terminal of the computer.

AUDIO GND. Audio ground.

Figure 4:
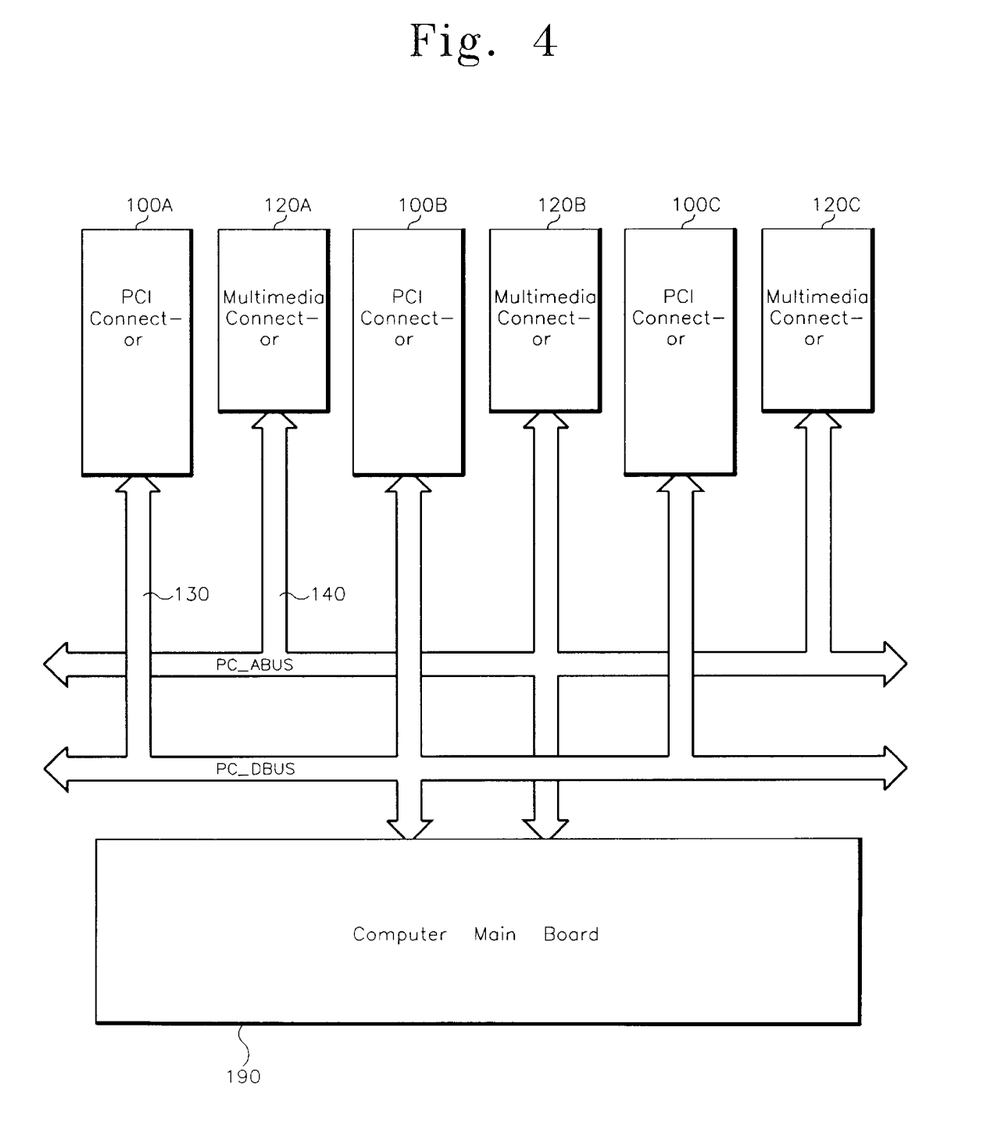
FIG. 4 is a schematic diagram showing PCI connectors and multimedia connectors incorporated with a computer system through a PCI bus and a multimedia bus in accordance with the principles of one embodiment of the present invention.

FIG. 4 shows a multimedia computer according to one embodiment of the invention. This computer is provided with the multimedia connectors 120A, 120B, 120C, together with the PCI connectors 100A, 100B, 100C. The multimedia connectors 120A, 120B, 120C have the same configuration as the one shown in FIG. 3, and coupled to the computer main board 190 through the multimedia bus 140. Numeral 130 denotes the PCI bus that connects the PCI connectors or slots 100A, 100B, 100C with the computer main board 190.

Figure 5:
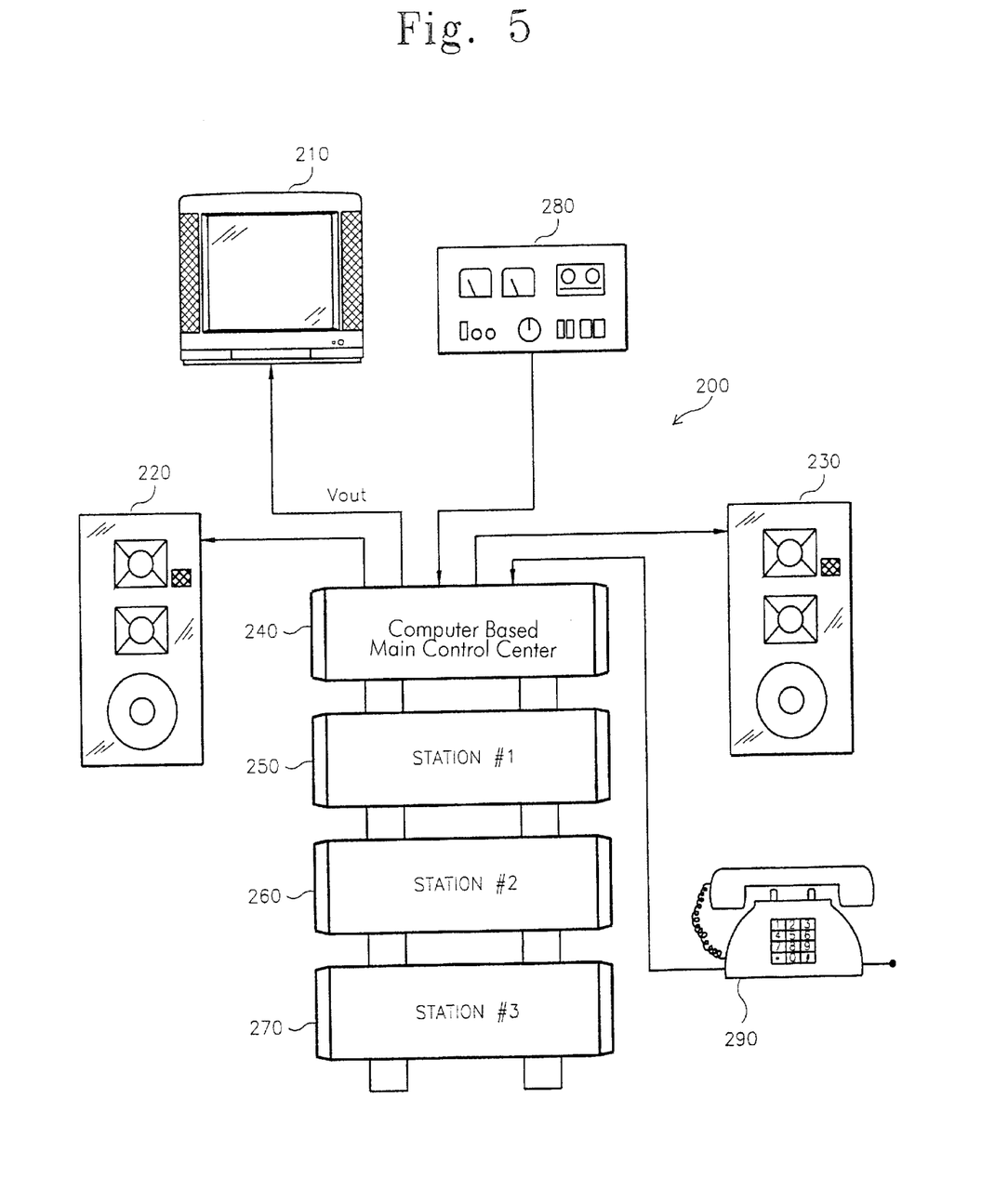
FIG. 5 is a schematic view showing the system layout of the multimedia player using the PCI bus and multimedia bus in accordance with the principles of another embodiment of the present invention.

According to another embodiment of the invention, a multimedia player system using the PCI bus and multimedia bus is provided as shown in FIG. 5. Referring to FIG. 5, the multimedia player system is composed of a computer-based main control center 240 and a plurality of stations 250, 260, 270 of analog audio/video sources which are connected by and expandable through the multimedia bus. Main control center 240 includes for example a computer main board mounted on the riser card, a CD-ROM drive, and an LCD module (not shown). Connected to the main control center 240 are a monitor display 210, a speaker system 220 and 230, an audio amplifier 280, and a telephone 290 connected by a modem. Also, the main control center 240 includes a hard disk drive storing an operating system of the computer, and a floppy disk drive. The first station 250 to third station 270 may include an external audio/video source such as digital satellite receivers, video disk players, CATV receiver sets, etc (not shown).

Figure 6:
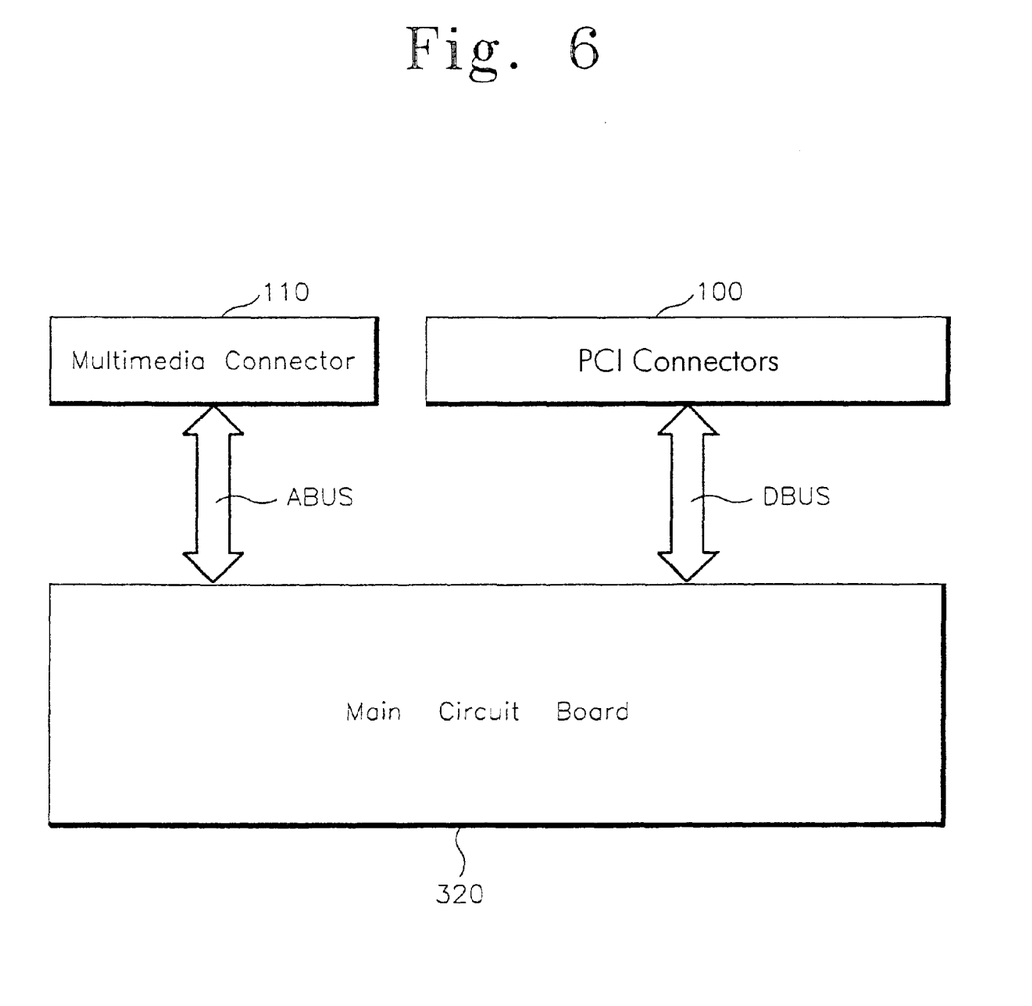
FIG. 6 is a schematic block diagram illustrating the connection of the PCI connector and the multimedia connector with the main circuit board of an external audio/video station shown in FIG. 5.
Figure 7:
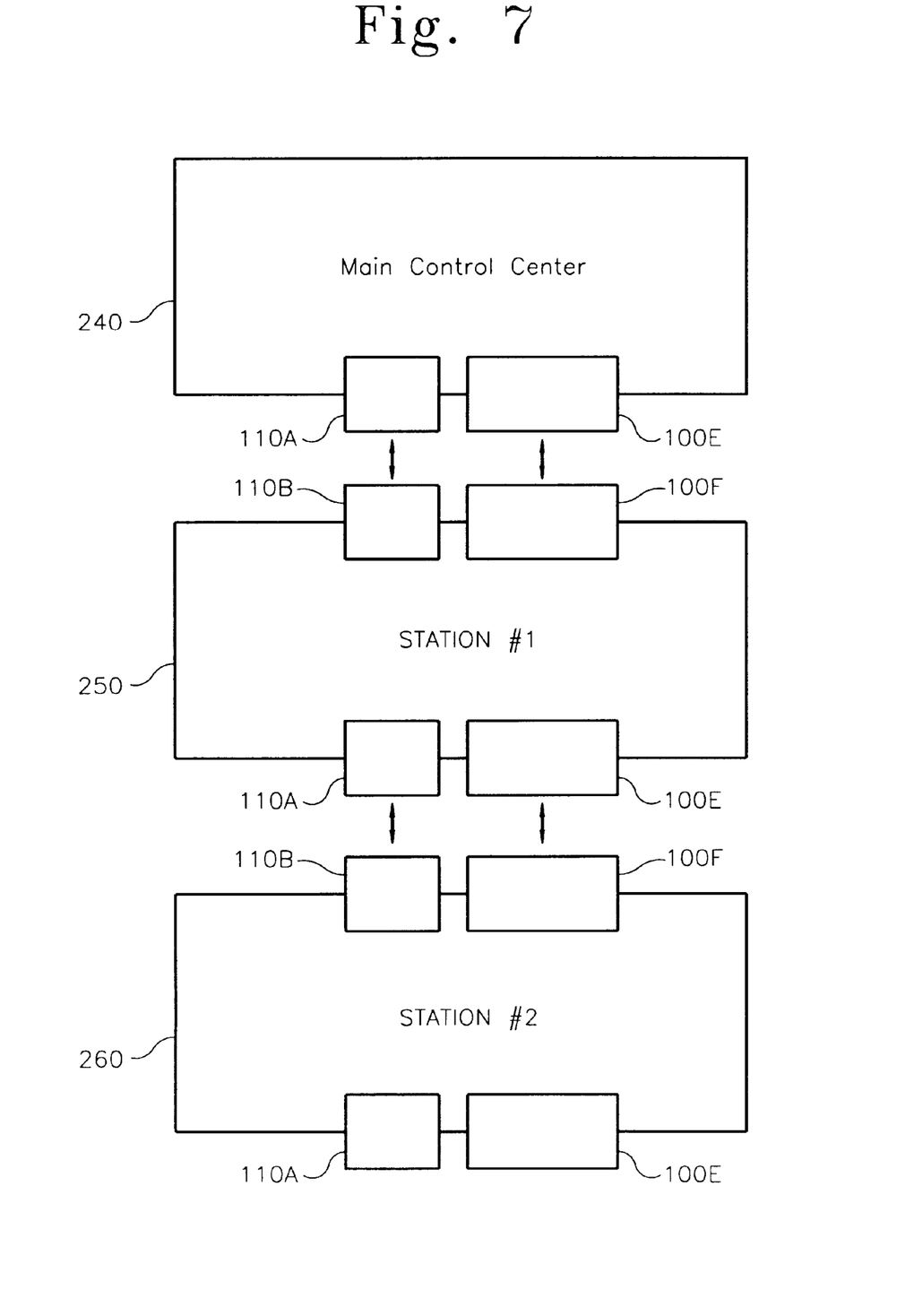
FIG. 7 is an outside view showing the arrangement of the PCI bus connector and the multimedia connector provided in the main control system and each of the stations shown in FIG. 5.

The main control center 240 and a plurality of the stations 250~270 include basically the multimedia connectors 110 and the PCI connectors 100 according to the present invention. As shown in FIG. 6, the multimedia connectors 110 and the PCI connectors 100 are coupled to the main circuit board 320 by the multimedia bus ABUS and PCI bus DBUS, respectively. Further, as shown in FIG. 7, the multimedia connectors 110 and the PCI connectors 100 are preferably mounted at the rear lower side of the housing of the main control center 240, and at the rear upper and lower side of each of the stations 250~270, in alignment with the connectors of the main control center 240. Also, each of the multimedia connectors 110 consists of a pair of male connectors 110A and female connectors 110B, and similarly the PCI connectors 100 consists of a pair of male connectors 100E and female connectors 100F. With the above arrangement, the station 250 is placed under the main control center 240 with the female connectors 110B and 100F of the station 250 being coupled with the male connectors 110A and 100E of the main control center 240. Thus, the stations 250~270 can be piled below the main control center 240 in order, and the stations are expandable based on the main control system 240, if necessary.

Figure 8:
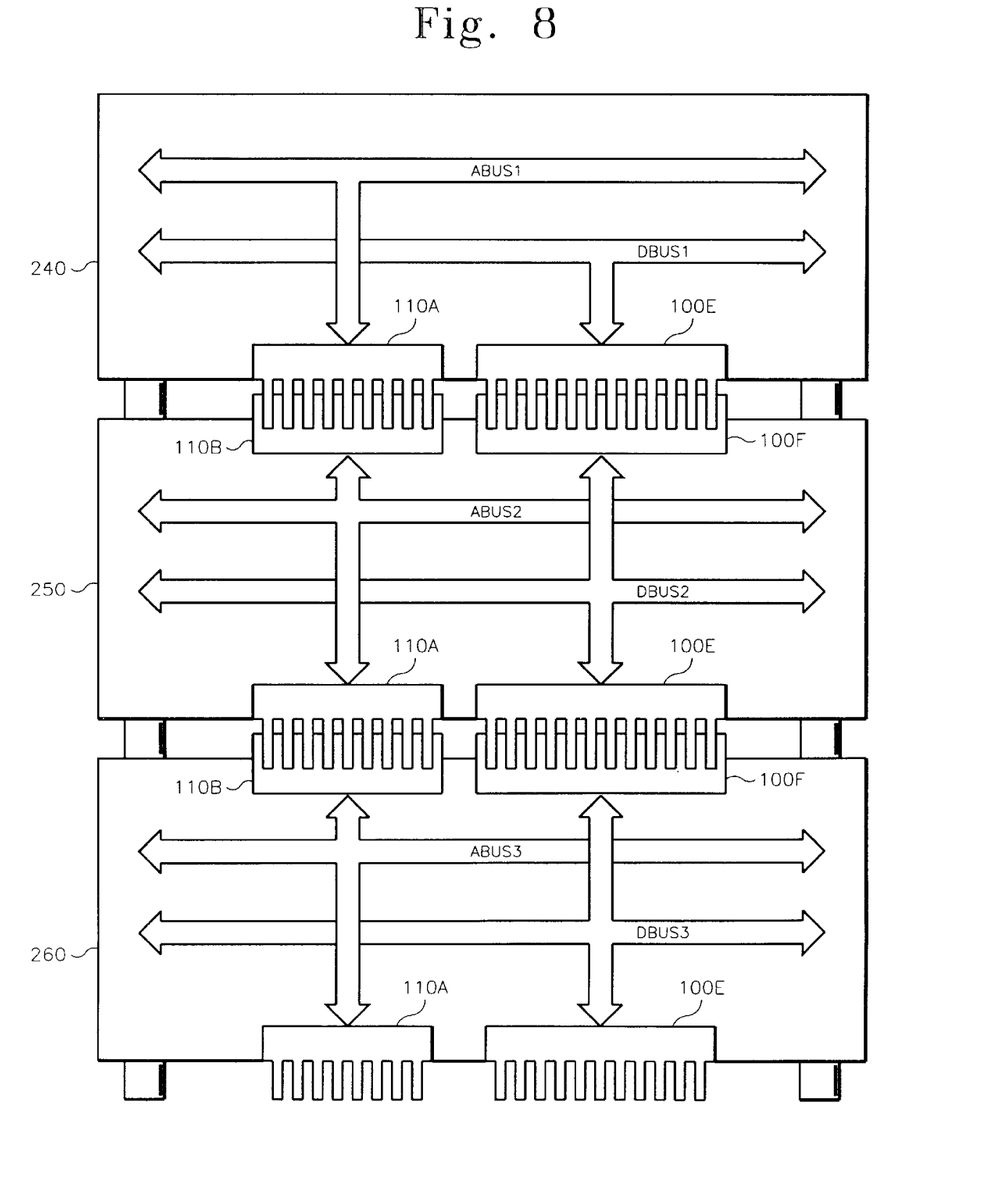
FIG. 8 is a schematic diagram showing the coupling state of the main control center and two stations, and interconnection of the multimedia bus and the PCI bus across the multimedia player shown in FIG. 5.

FIG. 8 shows the multimedia and PCI bus connections. Once the main control center 240 and the expandable stations 250, 260 are coupled through the multimedia connectors and the PCI connectors, the multimedia bus and the PCI bus in each of the stations (250 and 260) are connected in sequence, as shown in FIG. 8. The multimedia buses, ABUS2 and ABUS3, and the PCI buses, ABUS2 and ABUS3, are connected with multimedia bus ABUS1 and PCI bus DBUS1 of the main control center 240, respectively. Thus, the main control center 240 and the expandable stations, 250 and 260, are joined by multimedia and PCI connectors in component form and are connected internally by multimedia and PCI buses.

Figure 9:
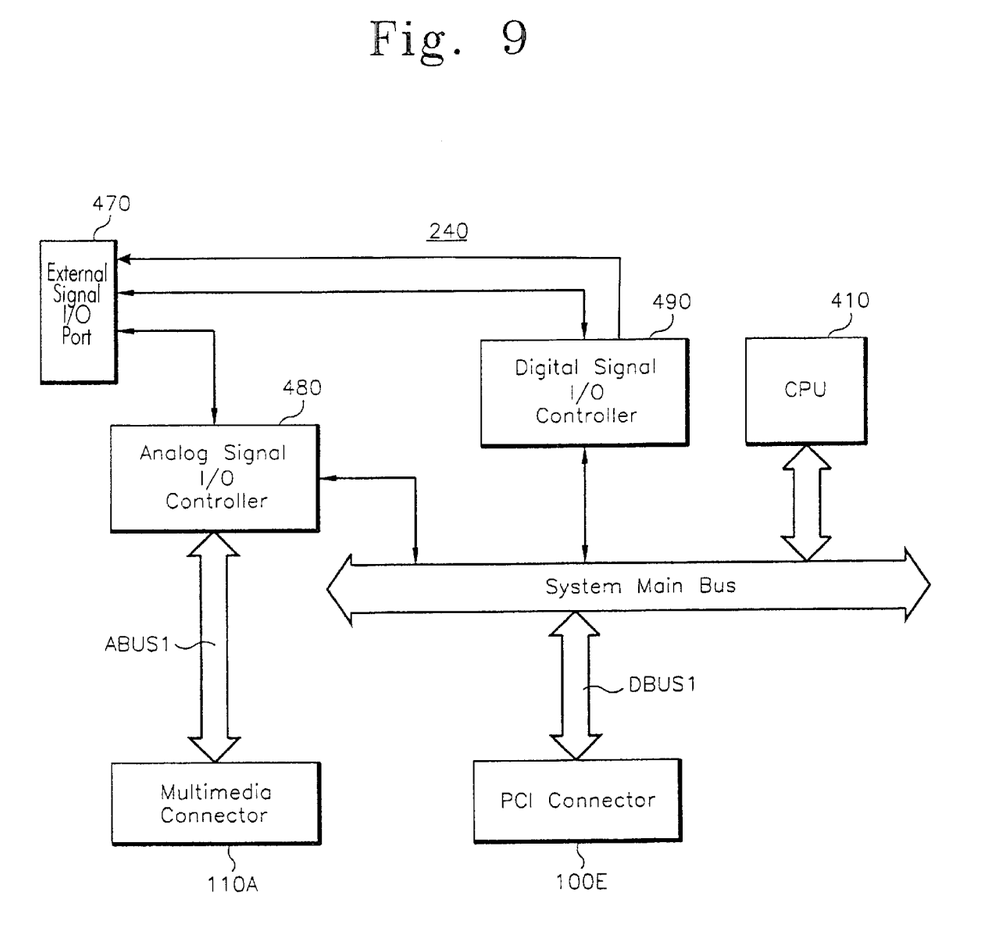
FIG. 9 illustrates, using a block diagram, the interface part of the main control center for connecting the multimedia connector and PCI connector in accordance with the principles of the present invention.

FIG. 9 shows an interface circuit for connecting an expandable station with the main control center according to the present invention. The multimedia connector 110A is connected with an analog signal input/output controller 480 via multimedia bus ABUS1, and the PCI connector 100E is connected with the system main bus through the PCI bus. Connected with the system main bus, there is provided a central processing unit 410 for controlling transfer of data and addresses and for operating the total multimedia player system. The main control center 240 also includes an external signal input/output port 470 for inputting or outputting analog or digital data from and to an external display apparatus such as a video monitor and a speaker system. The analog signal input/output controller 480 is configured to transfer selectively analog video/audio signals fed from one of the external stations to the external device through the input/output port 470 in accordance with a control signal furnished by the central processing unit 410 or to transfer required analog signals from the external device to one of the stations via the multimedia bus ABUS 1. Also, a digital signal input/out controller 490 is provided to control transfer of digital data to I/O port 470 from the external stations via PCI bus, DBUS1, and the system main bus.

As apparent from the foregoing, the present invention has given a bus structure applicable to a multimedia computer environment, in a novel and non-obvious fashion. In addition, by using a multimedia bus and its connector, a multimedia computer system can be joined with external audio/video sources in a component form (the number of which are expandable as much as needed). The analog audio/video signals, which cannot be transferred by the digital PCI bus, are capable of being transferred through the multimedia bus across a multimedia component system.

Further, according to the present invention, desired external audio/video sources can be selected by a control signal of the computer system. The multimedia player system as provided in the subject matter of the present invention provides for an integrated control system; and, maximizes versatility for an overall audio/video signal producing system.

While the invention has been described in terms of an exemplary embodiment, it is contemplated that it may be practiced as outlined above with modifications within the spirit and scope of the appended claims.

What is claimed is:

1. A multimedia player system comprising:
    a computer-based control center comprising control center analog input and output means for inputting and outputting analog signals, control center digital input and output means for inputting and outputting digital signals, and a system bus;
    a plurality of stations of analog audio and video sources, each station having station analog input and output means for inputting and outputting analog signals and station digital input and output means for inputting and outputting digital signals;
    a first connector system mounted at the control center and at one of the stations, the first connector system comprising a male connector of a first type of male connectors and a female connector of a first type of female connectors;
    a second connector system mounted adjacent to the first connector system, and at the control center and at said one of the stations, the second connector system comprising a male connector of a second type of male connectors and a female connector of a second type of female connectors;
    a first bus having a first plurality of signal lines for connecting pins of the first connector system with the control center analog input and output means of the control center and with the station analog input and output means of said one of the stations, said first bus being a multimedia analog bus; and
    a second bus having a second plurality of signal lines for connecting pins of the second connector system with the system bus of the control center and with the station digital input and output means of said one of the stations, the second bus being a peripheral component interconnect bus.

2. The multimedia player system of claim 1, wherein the signal lines of the first bus comprises:
    video signal lines VSYNC, HSYNC, CSYNC for vertical synchronizing signal, horizontal synchronizing signal, and composite synchronizing signal;
    color picture signals VGA_RED, VGA_GREEN, VGA_BLUE for supplying divided color picture signals to a videographics array card of a computer system;
    composite video signal line VIDEO_IN, wherein a signal NTSC/PAL indicates whether a television signal transferred through the VIDEO_IN line is of NTSC mode or of PAL mode;
    control signal lines VS0, VS1, VS2 for selecting one of the video sources;
    signal lines AUDIO_IN_LEFT, AUDIO_IN_RIGHT for transferring left channel stereo 1 audio source signals and right channel stereo audio source signals;
    signal lines AUDIO_OUT_LEFT, AUDIO_OUT_RIGHT for transferring left channel stereo audio output signals and right channel stereo audio output signals;

signal lines SCART_IN_LEFT, SCART_IN_RIGHT for transferring stereo audio source signals from external audio and video sources;

on and off control signal line DOBM for digital audio sources;

signal lines KB_CLK, KB_DATA for transferring keyboard clock signal and key input data;

signal lines VKB_CLK, VKB_DATA for transferring virtual keyboard clock signal and key input data;

signal lines MS_CLK, MS_DATA for transferring mouse clock signal and mouse output data;

signal lines VMS_CLK, VMS_DATA for transferring virtual mouse clock signal and mouse output data;

control signal lines AS0, AS1, AS2 for controlling analog audio sources;

control signal lines DS0, DS1, DS2 for controlling digital audio sources;

signal lines BVL, BW, BL for handling a power level of a battery;

a grounding line GND for a groundable source signal;

a signal line EXT_KEY for disabling video signals in accordance with an external device condition;

signal lines EXT_SMI0, EXT_SMI1 for supplying an external wake up signal when the computer system is being operated in a power management mode, wherein the first bus handles external color picture signals EXT_RED, EXT_GREEN, EXT_BLUE that are MPEG formatted;

a signal line DOCKIN indicative of docking station in;

a signal line VGA DCLK for VGA Dot clock signal;

an audio signal line PC_SPEAKER handling a pc-speaker terminal of the computer; and an audio ground signal line AUDIO GND.

3. The multimedia player system of claim 1, wherein said control center analog input and output means comprises an analog signal input/output controller connected to said system bus and connected, via said multimedia analog bus, to said first connector system.

4. The multimedia player system of claim 1, wherein said control center digital input and output means comprises a digital signal input/output controller connected to said system bus and connected, via said peripheral component interconnect bus, to said second connector system.

5. A multimedia player system comprising:

a computer-based control center comprising control center analog input and output means for inputting and outputting analog signals, control center digital input and output means for inputting and outputting digital signals, and a system bus interconnecting said control center analog input and output means and said control center digital input and output means;

a plurality of stations of analog audio and video sources, each station having station analog input and output means and station digital input and output means;

a first connector system mounted at the control center and at one of the stations;

a second connector system mounted adjacent to the first connector at the control center and at said one of the stations;

a first control center bus having a first plurality of signal lines for connecting pins of the first connector system with the control center analog input and output means of the control center, said first control center bus being a control center multimedia analog bus;

a second control center bus having a second plurality of signal lines for connecting pins of the second connector system with the system bus of the control center, said second control center bus being a control center peripheral component interconnect bus;

a first station bus having a first plurality of signal lines for connecting pins of the first connector system with the station analog input and output means of said one of the stations, said first station bus being a station multimedia analog bus; and a second station bus having a second plurality of signal lines for connecting pins of the second connector system with the station digital input and output means of said one of the stations, said second station bus being a station peripheral component interconnect bus.

6. The multimedia player system of claim 5, wherein the first plurality of signal lines of the first bus is for connecting the pins of the first connector system with the station digital input and output means of each of the stations, and the second plurality of signal lines of the second bus is for connecting the pins of the second connector system with the station analog input and output means of each of the stations.

7. The multimedia player system of claim 6, wherein a number of the pins located in each row of the first connector system is eighteen.

8. The multimedia player system of claim 6, wherein the signal lines of the first bus comprises:

video signal lines VSYNC, HSYNC, CSYNC for vertical synchronizing signal, horizontal synchronizing signal, and composite synchronizing signal;

color picture signals VGA_RED, VGA_GREEN, VGA_BLUE for supplying divided color picture signals to a videographics array card of a computer system;

composite video signal line VIDEO_IN, wherein a signal NTSC/PAL indicates whether a television signal transferred through the VIDEO_IN line is of NTSC mode or of PAL mode;

control signal lines VS0, VS1, VS2 for selecting one of the video sources;

signal lines AUDIO_IN_LEFT, AUDIO_IN_RIGHT for transferring left channel stereo audio source signals and right channel stereo audio source signals;

signal lines AUDIO_OUT_LEFT, AUDIO_OUT_RIGHT for transferring left channel stereo audio output signals and right channel stereo audio output signals;

signal lines SCART_IN_LEFT, SCART_IN_RIGHT for transferring stereo audio source signals from external audio and video sources;

on and off control signal line DOBM for digital audio sources;

signal lines KB_CLK, KB_DATA for transferring keyboard clock signal and key input data;

signal lines VKB_CLK, VKB_DATA for transferring virtual keyboard clock signal and key input data;

signal lines MS_CLK, MS_DATA for transferring mouse clock signal and mouse output data;

signal lines VMS_CLK, VMS_DATA for transferring virtual mouse clock signal and mouse output data;

control signal lines AS0, AS1, AS2 for controlling analog audio sources;

control signal lines DS0, DS1, DS2 for controlling digital audio sources;

signal lines BVL, BW, BL for handling a power level of a battery;

a grounding line GND for a groundable source signal;

a signal line EXT_KEY for disabling video signals in accordance with an external device condition;

signal lines EXT_SMI0, EXT_SMI1 for supplying an external wake up signal when the computer system is being operated in a power management mode, wherein the first bus handles external color picture signals EXT_RED, EXT_GREEN, EXT_BLUE that are MPEG formatted;

a signal line DOCKIN indicative of docking station in;

a signal line VGA DCLK for VGA Dot clock signal;

an audio signal line PC_SPEAKER handling a pc-speaker terminal of the computer; and an audio ground signal line AUDIO GND.

9. The multimedia player system of claim 5, wherein the pins of the first connector system and the second connector system are arranged in three rows, the first connector system comprising a male connector of a first type of male connectors and a female connector of a first type of female connectors, the male connector of the first type of male connectors being compatible with and detachable from the female connector of the first type of female connectors, the second connector comprising a male connector of a second type of male connectors and a female connector of a second type of female connectors, the male connector of the second type of male connectors being compatible with and detachable from the female connector of the second type of female connectors.

10. The multimedia player system of claim 5, wherein the pins of the first connector system are arranged in two rows, the first connector system comprising a female connector mounted on a main board of a computer to receive corresponding terminals of a functional expansion board producing an audio-video signal, the functional expansion board permitting expansion of functions of the multimedia player system.

11. The multimedia player system of claim 5, wherein the signal lines of the first bus comprises:

video signal lines VSYNC, HSYNC, CSYNC for vertical synchronizing signal, horizontal synchronizing signal, and composite synchronizing signal;

color picture signals VGA_RED, VGA_GREEN, VGA_BLUE for supplying divided color picture signals to a videographics array card of a computer system;

composite video signal line VIDEO_IN, wherein a signal NTSC/PAL indicates whether a television signal transferred through the VIDEO_IN line is of NTSC mode or of PAL mode;

control signal lines VS0, VS1, VS2 for selecting one of the video sources;

signal lines AUDIO_IN_LEFT, AUDIO_IN_RIGHT for transferring left channel stereo audio source signals and right channel stereo audio source signals;

signal lines AUDIO_OUT_LEFT, AUDIO_OUT_RIGHT for transferring left channel stereo audio output signals and right channel stereo audio output signals;

signal lines SCART_IN_LEFT, SCART_IN_RIGHT for transferring stereo audio source signals from external audio and video sources;

on and off control signal line DOBM for digital audio sources;

signal lines KB_CLK, KB_DATA for transferring keyboard clock signal and key input data;

signal lines VKB_CLK, VKB_DATA for transferring virtual keyboard clock signal and key input data;

signal lines MS_CLK, MS_DATA for transferring mouse clock signal and mouse output data;

signal lines VMS_CLK, VMS_DATA for transferring virtual mouse clock signal and mouse output data;

control signal lines AS0, AS1, AS2 for controlling analog audio sources;

control signal lines DS0, DS1, DS2 for controlling digital audio sources;

signal lines BVL, BW, BL for handling a power level of a battery;

a grounding line GND for a groundable source signal;

a signal line EXT_KEY for disabling video signals in accordance with an external device condition;

signal lines EXT_SMI0, EXT_SMI1 for supplying an external wake up signal when the computer system is being operated in a power management mode, wherein the first bus handles external color picture signals EXT_RED, EXT_GREEN, EXT_BLUE that are MPEG formatted;

a signal line DOCKIN indicative of docking station in;

a signal line VGA DCLK for VGA Dot clock signal;

an audio signal line PC_SPEAKER handling a pc-speaker terminal of the computer; and an audio ground signal line AUDIO GND.

12. The multimedia player system of claim 5, wherein the control center comprises an external signal input and output port for transmitting and receiving analog data and digital data to and from an external audio and video display apparatus.

13. The multimedia player system of claim 5, wherein the station analog input and output means is configured to selectively transfer external analog signals from an external station device to an external audio and video display apparatus through a multimedia bus and through an external signal input and output port in accordance with a control signal of a central processing unit.

14. The multimedia player system of claim 5, wherein the station digital input and output means controls a transfer of digital data from said each station to the system bus via a peripheral component interconnect bus.

15. The multimedia player system of claim 5, wherein said control center analog input and output means comprises an analog signal input/output controller connected to said system bus and connected, via said control center multimedia analog bus, to said first connector system.

16. The multimedia player system of claim 5, wherein said control center digital input and output means comprises a digital signal input/output controller connected to said system bus and connected, via said control center peripheral component interconnect bus, to said second connector system.

17. A multimedia player system comprising:

a computer-based control center comprising a central processing unit, control center analog input and output means for inputting and outputting analog signals, control center digital input and output means for inputting and outputting digital signals, and a system bus interconnecting said central processing unit with said control center analog input and output means and said control center digital input and output means;

a plurality of stations of analog audio and video sources, each station having station analog input and output means for inputting and outputting analog signals and station digital input and output means for inputting and outputting digital signals;

a first connector system mounted at the control center and at one of the stations;

a second connector system mounted adjacent to the first connector, and at the control center and at said one of the stations;

first control center bus means having a first plurality of signal lines for connecting pins of the first connector system with the control center analog input and output means of the control center, said first bus means being a multimedia analog bus; and second control center bus means having a second plurality of signal lines for connecting pins of the second connector system with the system bus of the control center, the second control center bus means being a peripheral component interconnect bus.

18. The multimedia player system of claim 17, wherein said control center analog input and output means comprises an analog signal input/output controller connected to said system bus and connected, via said multimedia analog bus, to said first connector system.

19. The multimedia player system of claim 17, wherein said control center digital input and output means comprises a digital signal input/output controller connected to said system bus and connected, via said peripheral component interconnect bus, to said second connector system.

* * * * *